US011252242B2

(12) United States Patent
Armistead et al.

(10) Patent No.: US 11,252,242 B2
(45) Date of Patent: Feb. 15, 2022

(54) MANAGEMENT OF DAISY CHAIN CONNECTED COMMUNICATION NETWORK OF ELEVATOR FIXTURES WITH REDUNDANT DATA PATHS

(71) Applicant: Otis Elevator Company, Farmington, CT (US)

(72) Inventors: Jason R. Armistead, Avon, CT (US); Rob Greger, Canton, CT (US); SaiPraveen Reddy Polimera, New Britain, CT (US); Sajan Shrestha, Plainville, CT (US); Paul A. Stranieri, Bristol, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 153 days.

(21) Appl. No.: 16/677,797

(22) Filed: Nov. 8, 2019

(65) Prior Publication Data

US 2020/0153913 A1    May 14, 2020

Related U.S. Application Data

(60) Provisional application No. 62/758,349, filed on Nov. 9, 2018.

(51) Int. Cl.
*H04L 29/08*     (2006.01)
*H05B 47/175*    (2020.01)
(Continued)

(52) U.S. Cl.
CPC .............. *H04L 67/16* (2013.01); *H04L 12/44* (2013.01); *H04L 12/46* (2013.01); *H04L 67/12* (2013.01); *H05B 47/175* (2020.01)

(58) Field of Classification Search
CPC ......... H04L 12/42; H04L 12/44; H04L 12/46; H04L 29/06; H04L 29/08; H04L 41/12;
(Continued)

(56) References Cited

U.S. PATENT DOCUMENTS 9,806,810 B2 * 10/2017 Raj ..................... H04B 10/1149
2008/0155073 A1 * 6/2008 Swain ..................... H04L 12/42
709/222

(Continued)

OTHER PUBLICATIONS

European Search Report for application EP19208338.4, dated Apr. 1, 2020, 62 pages.

*Primary Examiner* — Robert B Harrell
(74) *Attorney, Agent, or Firm* — Cantor Colburn LLP

(57) ABSTRACT

A method of interconnecting a daisy chain communication network having a terminal managers and a plurality of managed switches and a plurality of fixtures operable as clients of a client server network. The method also includes transmitting a discovery message to a first fixture and a second fixture, capturing the discovery message in the first fixture and the second fixture, and determining a first head fixture and at least one of a second head fixture and a tail fixture. Furthermore, the method also includes discovering an intermediate fixture based on the first head fixture and the at least one of a second head fixture and a tail fixture, resolving which of the first head fixture and the at least one of a second head fixture and a tail fixture is to be identified as an active head fixture, and establishing the active head fixture and a passive tail fixture.

5 Claims, 6 Drawing Sheets

(51) Int. Cl.
*H04L 12/44* (2006.01)
*H04L 12/46* (2006.01)

(58) Field of Classification Search
CPC ..... H04L 43/10; H04L 43/0811; H04L 45/00;
H04L 45/02; H04L 45/04; H04L 47/10;
H04L 67/00; H04L 67/02; H04L 67/12;
H04L 67/16; H05B 37/02; H05B
37/0245; H05B 47/175; B66B 1/343;
B66B 1/3466; G06F 13/00
USPC ..................................................... 370/400
See application file for complete search history.

(56) References Cited

U.S. PATENT DOCUMENTS

| | | |
|---|---|---|
| 2010/0165883 A1 | 7/2010 | Holness et al. |
| 2016/0029464 A1* | 1/2016 | Hughes ............... H05B 47/19 315/131 |
| 2017/0026119 A1* | 1/2017 | Raj .................. H04B 10/1149 |
| 2018/0316567 A1 | 11/2018 | Drury |

* cited by examiner

MANAGEMENT OF DAISY CHAIN CONNECTED COMMUNICATION NETWORK OF ELEVATOR FIXTURES WITH REDUNDANT DATA PATHS

CROSS-REFERENCE TO RELATED APPLICATIONS

This application claims the benefit of U.S. Provisional Application No. 62/758,349 filed Nov. 9, 2018, which is incorporated herein by reference in its entirety.

BACKGROUND

The embodiments herein relate to a communication network for elevator fixtures, more specifically a daisy chain connected network having redundant data paths and a management method therefor.

Existing destination entry fixtures, generally use a star-wired Ethernet topology which requires "home run" wiring from each fixture to the machine room and is non-redundant. Bundles of wires must be connected to/from each destination entry control panel, which is bulky and expensive, and requires a correspondingly large number of network ports in the controller, e.g. 24+ switch ports. In addition, as the building size increased longer runs of wires are necessary for each fixture. Furthermore, in some instances depending on the location of the control panel, the distances to the fixtures can become large enough to impact the reliability of Ethernet communication, and may require repeaters. Longer cable runs also increase the logistics of managing larger cable bundles and increase the risk of damage to an Ethernet cable, which would disable the associated fixture. It would be advantageous to have a communication management system and scheme that reduces wiring saving cost and materials.

BRIEF SUMMARY

According to an embodiment, described herein is a method of interconnecting a daisy chain communication network having a plurality of terminal managers operable as a server in operable communication with a plurality of managed switches and a plurality of fixtures operable as clients of a client server network. The method includes operably connecting a first port of a first fixture of the plurality of fixtures to a port of a first managed switch of the plurality of managed switches, operably connecting a second port of a first fixture of the plurality of fixtures to a first port of a second fixture of the plurality of fixtures, and operably connecting a second port of the second fixture of the plurality of fixtures to a first port of a second managed switch of the plurality of managed switches to form the daisy chain communication network. The method also includes transmitting a discovery message from at least one a first terminal manager to at least one of the first managed switch and the second managed switch, transmitting the discovery message from the first managed switch to the first fixture of the plurality of fixtures and transmitting the discovery message from the second managed switch to the second fixture of the plurality of fixtures, capturing the discovery message in first head fixture and the at least one of a second head fixture and a tail fixture in the daisy chain network, and determining from the discovery message a first head fixture and at least one of a second head fixture and a tail fixture. Furthermore, the method also includes discovering at least one intermediate fixture based on the first head fixture and the at least one of a second head fixture and a tail fixture in the daisy chain network, resolving which of the first head fixture and the at least one of a second head fixture and a tail fixture is to be identified as an active head fixture, establishing the active head fixture and a passive tail fixture and refreshing a MAC table for the plurality of managed switches and the plurality of fixtures of the daisy chain communication network.

Technical effects of embodiments of the present disclosure include destination entry systems featuring a number of daisy chains of fixtures, with each fixture in the chain connected to its neighbor or to an Ethernet switch in the controller (i.e. two data paths into each daisy chain) provides the basic architecture. As part of the management of the network, controller devices employ a process to identify devices at the end of each daisy chain using predetermined formed network messages. The combination of hardware and software in each daisy chained fixture device is able to ensure not only that the daisy chain communication network is properly formed during power-up of one or more devices in the network, but also that no network loops are formed, and that the redundant message paths are used in the event of a failure in the system. Advantageously, as a result, the amount of Ethernet cabling is significantly reduced, resulting in immediate cost savings over legacy configurations. Moreover, a further benefit is achieve on installation because of the reduction in the size of trunking, space, and materials required to run the harnessing down the hoistway. Further savings are realized in implementation of controller as the required number of Ethernet switch ports is significantly reduced. In one example, a traditional system having 40 fixtures would require 42 Ethernet ports, while a system implemented employing the described embodiments having 4 daisy chains would require only 12 ports.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited to the accompanying figures in which like reference numerals indicate similar elements.

DETAILED DESCRIPTION

Figure 1:
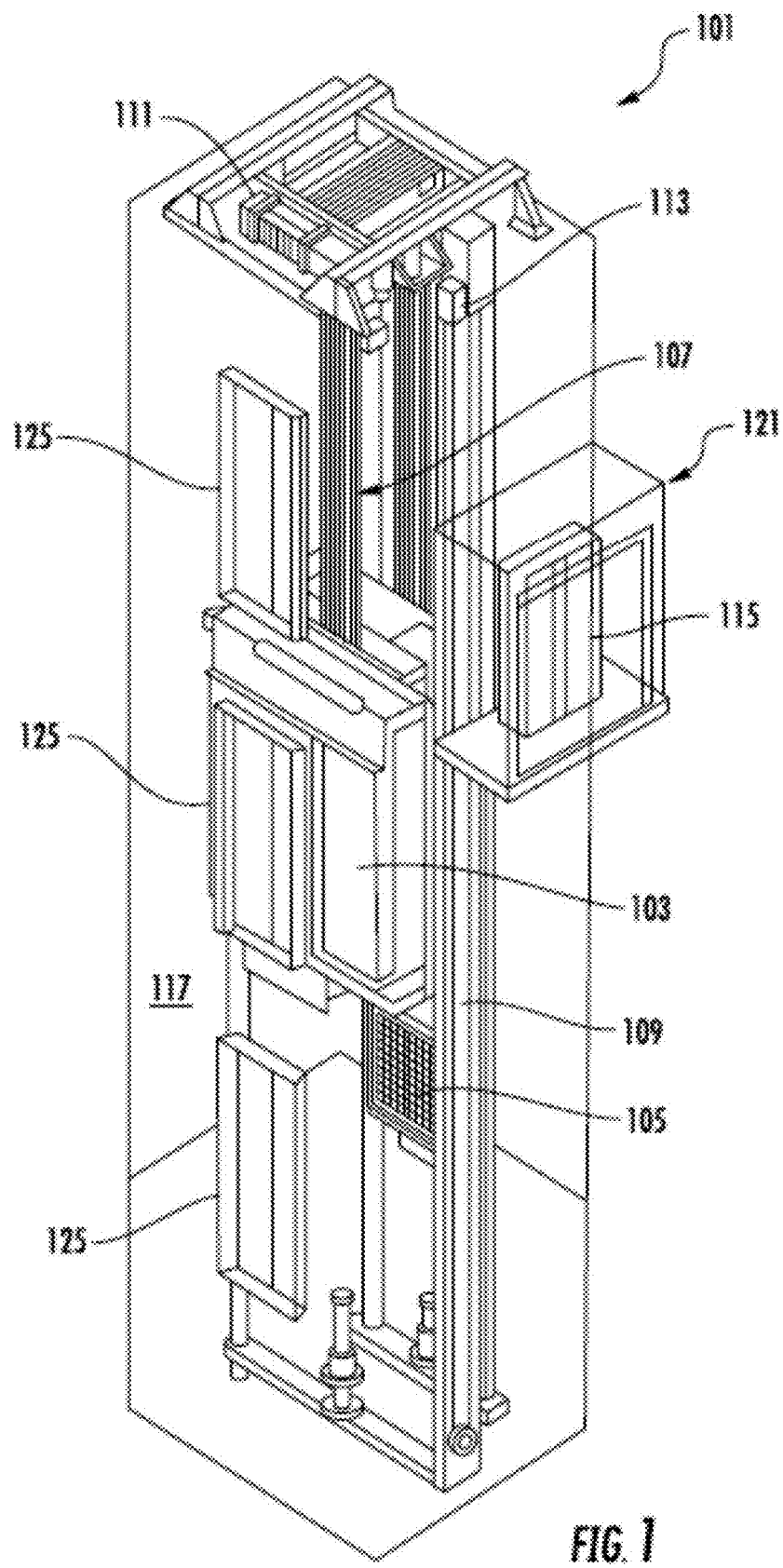
FIG. 1 is a schematic illustration of an elevator system that may employ various embodiments of the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. The following description is merely illustrative in nature and is not intended to limit the present disclosure, its application or uses. It should be understood that throughout the drawings, corresponding reference numerals indicate like or corresponding parts and features. As used herein, the term controller refers to processing circuitry that may include an application specific integrated circuit (ASIC), an electronic circuit, an electronic processor (shared, dedicated, or group) and memory that executes one or more software or firmware programs, a combinational logic circuit, and/or other suitable interfaces and components that provide the described functionality.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail 109, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car 103 and/or counter weight 105, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller 115 may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car 103 within an elevator shaft 117 may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car 103. FIG. 1 is merely a non-limiting example presented for illustrative and explanatory purposes.

Figure 2:
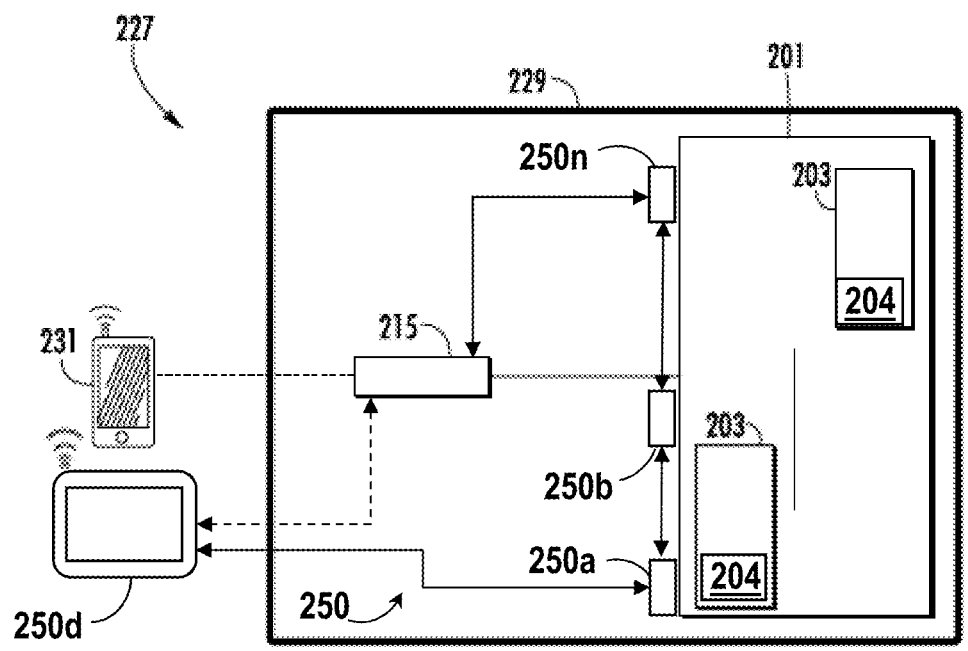
FIG. 2 is a schematic illustration of a system in accordance with an embodiment of the present disclosure.

Turning now to FIG. 2, a schematic illustration of a building system 227 in an example embodiment of the present disclosure is shown. The building system 227 includes an elevator system 201 installed within a structure 229 (e.g., a building). In some embodiments, the structure 229 may be an office building or a collection of office buildings that may or may not be physically located near each other. The structure 229 may include any number of floors that are accessible by the elevator system 201 and thus the structure 229 can include any number of landings (e.g., as shown in FIG. 1). Persons entering the structure 229 may enter at a lobby floor and may travel to a destination floor via one or more elevator cars 203 that are part of the elevator system 201.

The elevator system 201 may include one or more computing devices, such as an elevator controller 215 and a car controller 204. The elevator controller 215 may be configured to control dispatching operations for one or more elevator cars 203 associated with the elevator system 201. The functions of the elevator controller 215 may also be partitioned. For example, in one configuration the elevator controller 215 may be configured to, and be responsible for, controlling system operation and dispatching operations for one or more elevator cars e.g., 203 associated with the elevator system 501 as described herein. While another controller, denoted here 204 may be configured to, and responsible for, controlling operations associated with individual elevator cars 203. It is understood that the elevator system 201 may utilize more than one elevator controller 215, and that each elevator controller 215 may control a group of elevators cars 203. In addition, an individual car controller 204 may be employed to address controlling functions for each of the individual elevator cars 203 respectively. The elevator system 201 also includes one or more fixtures shown generally as 250 and more particularly as 250a, 250b, . . . 250n each distributed at a lobby in the building and one or more floors. The fixtures 250 include, but are not limited to an elevator call button, hall call buttons, and the like and may further include information panels, lanterns, direction arrows and the like as may be employed to provide information about the elevator cars 203 and their destinations. The fixtures may also include a control panel kiosk 250d where a passenger may enter a destination request. The fixtures 250 are configured to communicate with the elevator controller 215 as may be required to control dispatching operations for one or more elevator cars 203 associated with the elevator system 201. In an embodiment, the fixtures communicate with the elevator controller 215 in a daisy chain network as described further herein. Although two elevator cars 203 are shown in FIG. 2, those of skill in the art will appreciate that any number of elevators cars may be employed in the elevator and building systems that employ embodiments of the present disclosure. The elevator cars 203 can be located in the same hoistway or in different hoistways so as to allow coordination amongst elevator cars 203 in different elevator banks serving different floors (e.g., sky lobbies, etc.). It is understood that the elevator system 201 may include various features as described above with reference to FIG. 1 and may also include other non-depicted elements and/or features as known in the art (e.g., drive, counterweight, safeties, etc.). Moreover, the elevators may be employed in any configuration with all elevators serving all floors of the building, some elevators only serving certain floors, a first group of elevator serving lower floors of a building and a sky lobby and a second group of elevators serving the sky lobby and upper floors of the building, etc.

Figure 4:
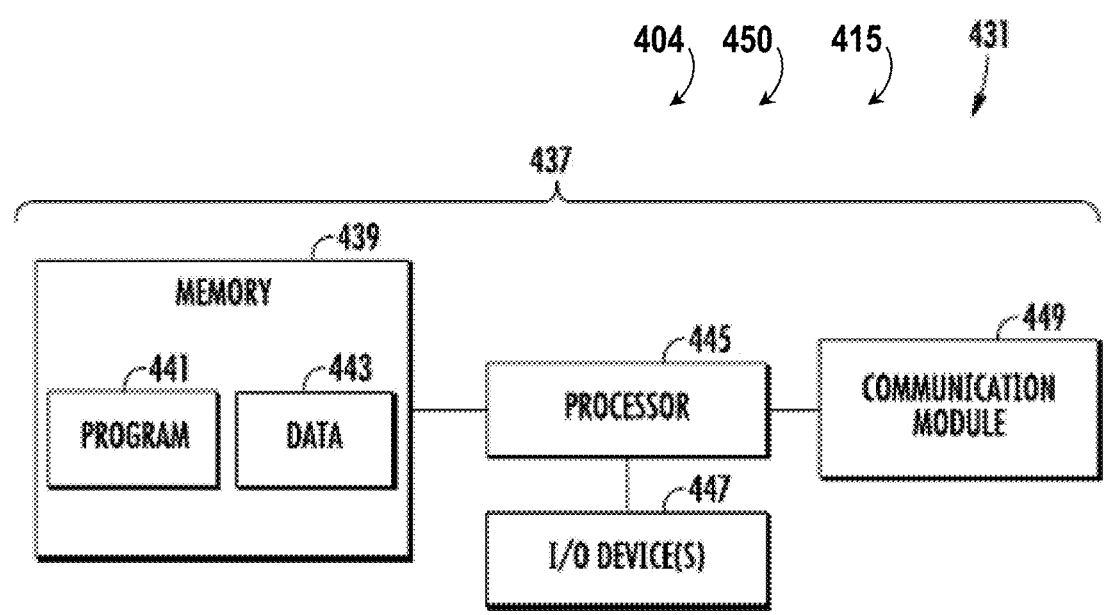
FIG. 4 is a schematic illustration of a computing system of a user device and/or controller in accordance with an embodiment of the present disclosure.

Also shown in FIG. 2 is a user device 231, such as a mobile device (e.g., smart phone, smart watch, wearable technology, laptop, tablet, etc.). The user device 231 may include a mobile and/or personal device that is typically carried by a person, such as a phone, PDA, etc. The user device 231 may include a processor, memory, and communication module(s), as shown in FIG. 4. As described below, the processor can be any type or combination of computer processors, such as a microprocessor, microcontroller, digital signal processor, application specific integrated circuit, programmable logic device, and/or field programmable gate array. The memory can be a non-transitory computer readable storage medium tangibly embodied in the user device 231 including executable instructions stored therein, for instance, as firmware. The communication module may implement one or more communication protocols as described in further detail herein, and may include features to enable wireless communication with external and/or remote devices separate from the user device 231. The user device 231 may further include a user interface (e.g., a display screen, a microphone, speakers, input elements such as a keyboard or touch screen, etc.) as known in the art.

The elevator controller 215, and or car controller 204 may also include a processor, memory, and a communication module also as shown in FIG. 4. Similar to the user device 231, the processor memory, and communication module may be implemented as described herein, but as part of the elevator system 201. Furthermore the fixtures, 250 including the kiosk 250 may also include a processor, memory, and a communication module also as shown in FIG. 4. Similar to the user device 231 and elevator controller 215, car controller 204, the processor memory, and communication module may be implemented as described herein, but as part of the elevator system 201.

Figure 3:
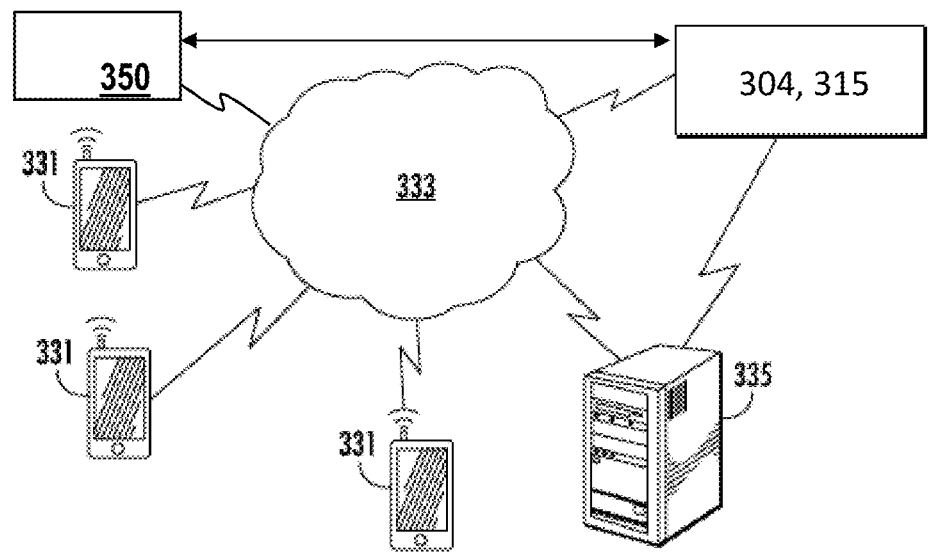
FIG. 3 is a schematic illustration of a network system in accordance with an embodiment of the present disclosure.

A user device e.g., 231, 331 and an elevator controller e.g., 215, 315 and car controller 204, 304 in accordance with embodiments of the present disclosure can communicate with one another, e.g., as shown in FIG. 3. For example, one or more user device(s) 331 and the elevator controller 315 and/or car controller 304 may communicate with one another when proximate to one another (e.g., within a threshold distance). The user device 331 and the elevator controller 315 may communicate over a network 333, that may be wired or wireless. Wired communication can be conventional including standard hard wiring or Ethernet. In an embodiment, the fixtures are connected with the elevator controller employing a daisy chain connected Ethernet interface as described herein. Wireless communication networks can include, but are not limited to, Wi-Fi®, short-range radio (e.g., Bluetooth®), near-field infrared, cellular network, etc. In some embodiments, the car controller 304 and/or elevator controller 315 may include, or be associated with (e.g., communicatively coupled to) one or more networked building elements 335, such as computers, kiosks, beacons, hall call fixtures 350, lanterns, bridges, routers, network nodes, etc. The networked building element 335 may also communicate directly or indirectly with the user devices 331 using one or more communication protocols or standards (e.g., through the network 333).

For example, the networked building element 335 may communicate with the user devices 331 using near-field communications (NFC) (e.g., network 333) and thus enable communication between the user devices 331 the car controller 304, and the elevator controller 315. In some embodiments, the elevator controller 315 or the car controller 304 may establish communication with one or more user devices 331 that are outside of the structure/building. Such connection may be established with various technologies including GPS, triangulation, or signal strength detection, by way of non-limiting example. Such technologies that allow communication can provide users and the system(s) described herein more time to perform the described functions. In example embodiments, the user devices 331 communicate with the elevator controller 315 and/or the car controller 304 over multiple independent wired and/or wireless networks. Embodiments are intended to cover a wide variety of types of communication between the user devices 331, the car controller and/or the elevator controller 315, and embodiments are not limited to the examples provided in this disclosure.

The network 333 may be any type of known communication network including, but not limited to, a wide area network (WAN), a local area network (LAN), a global network (e.g. Internet), a virtual private network (VPN), a cloud network, and an intranet. The network 333 may be implemented using a wireless network or any kind of physical network implementation known in the art. In another embodiment, the network 333 is a daisy chained Ethernet network between the fixtures e.g., 350 and the elevator controller 315 as described further herein. The user devices 331 and/or the networked building element 335 may be coupled to the elevator controller 315 and/or the car controller 304 through multiple networks 333 (e.g., cellular and Internet) so that not all user devices 331 and/or the networked building element 335 are coupled to the elevator controller 315 through the same network 333. One or more of the user devices 331, the car controller, and/or the elevator controller 315 may be connected to the network 333 in a wireless fashion. In one non-limiting embodiment, the network 333 is the Internet and one or more of the user devices 331 execute a user interface application (e.g. a web browser) to contact the elevator controller 315 through the network 333.

Embodiments provided herein are directed to apparatuses, systems, and methods for making and fulfilling requests for elevator service. In some embodiments, a request for elevator service may be communicated over one or more lines, connections, or networks, such as network 333, e.g., a request made by a user device 331 and transmitted through the network 333 to the elevator controller 315 to request elevator service. The request for service may be initiated by a mobile device controlled by and/or associated with a user, in a passive or active manner Other embodiments provided herein making and fulfilling requests for elevator service where the request for elevator service may be communicated over one or more lines, connections, or networks, such as network 333, e.g., a request made by fixture 350 and transmitted through the daisy chain Etherenet network (e.g., 333) as described herein to the elevator controller 315 to request elevator service. The request for service whether initiated by a mobile device controlled by and/or associated with a user, in a passive or active manner with a fixture 350. In some embodiments, the mobile device may be operative in conjunction with a Transmission Control Protocol (TCP) and/or a User Datagram Protocol (UDP). In some embodiments, a request for service may be authenticated or validated based on a location of the user device 331. In some embodiments, a request for service may be fulfilled in accordance with one or more profiles, such as one or more user or mobile device profiles. In some embodiments the profiles may be registered as part of a registration process. In some embodiments, an elevator system 101 may be registered with a service provider.

As noted, the elevator controller 315 and/or the car controller 304 may be associated with an elevator system (e.g., elevator systems 101, 201). The elevator controller 315 may be used to process or fulfill the requests for elevator service that are submitted from one or more user devices 331. The requests for elevator service may be received through the network 333 from the one or more user devices 331 and/or the networked building elements 335, which may be mobile devices, including, but not limited to phones, laptops, tablets, smartwatches, etc. One or more of the user devices 331 may be associated with (e.g., owned by) a particular user. The user may use his/her user device(s) 331 to request elevator service. Likewise, the car controller 304 may interface with the elevator controller 315 to ensure that a user's requests are carried out, functions are provided in the elevator car 303 and the like. In an embodiment, the car controller 304 may interface directly with one or more user devices to facilitate communications with the user particularly when in a respective elevator car. For example, the car controller may provide status information, news, communications, time of arrival and the like to a user device 331.

Referring now to FIG. 4, schematic block diagram illustrations of example computing systems 437 as may be employed for a user device 431, an elevator controller 415, car controller 404, and/or a kiosk or fixture 450 respectively, are shown. The computing system 437 may be representative of computing elements or components of user devices e.g., 331, 431, networked building elements 335, mobile devices controller, fixtures, etc. as employed in embodiments of the present disclosure. The computing system 437 can be configured to operate the user device 431, elevator controller 415, car controller 404, fixture, etc. including, but not limited to, operating and controlling a touch-screen display to display various output and receive various input from a user's interaction with the touch-screen display. The computing system 437 may be connected to various elements and components within a building that are associated with operation of an elevator system 101.

As shown, the computing system 437 includes a memory 439, which may store executable instructions and/or data. The executable instructions may be stored or organized in any manner and at any level of abstraction, such as in connection with one or more applications, apps, programs, processes, routines, procedures, methods, etc. As an example, at least a portion of the instructions are shown in FIG. 4 as being associated with a program 441. The memory 439 can include RAM and/or ROM and can store the program 441 thereon, wherein the program 441 may also include an operating system and/or applications to be used on the user device 431, elevator controller 415, car controller 404, fixtures 450 and the like. Further, the memory 439 may store data 443. The data 443 may include profile or registration data (e.g., in a user device 331, 431), a device identifier, or any other type(s) of data, product configuration and the like. The executable instructions stored in the memory 439 may be executed by one or more processors, such as a processor 445, which may be a mobile processor in the user device 431 mobile application or a standard processor as my be employed in the elevator controller 415, car controller 404 or a fixture 450. The processor 445 may be operative on the data 443 and/or configured to execute the program 441. In some embodiments, the executable instructions can be performed using a combination of the processor 445 and remote resources (e.g., data and/or programs stored in the cloud (e.g., remote servers).

The processor 445 may be coupled to one or more input/output (I/O) devices 447. In some embodiments, the I/O device(s) 447 may include one or more of a physical keyboard or keypad, a touchscreen or touch panel, a display screen, a microphone, a speaker, a mouse, one or more push button, e.g., parts or features of a telephone or mobile device (e.g., a smartphone), or panel buttons. For example, the I/O device(s) 447 may be configured to provide an interface to allow a user to interact with the user device 431, car controller 404, elevator controller 415, or fixture 450. In some embodiments, the I/O device(s) 447 may support a graphical user interface (GUI) and/or voice-to-text capabilities for the user device 431.

The components of the computing system 437 may be operably and/or communicably connected by one or more buses. The computing system 437 may further include other features or components as known in the art. For example, the computing system 437 may include one or more communication modules 449, e.g., transceivers and/or devices configured to receive information or data from sources external to the computing system 437a. In one embodiment, the communication modules 449 may include Ethernet interfaces configured for implementing the daisy chain network as described herein. In another non-limiting embodiment, the communication modules 449 of the user device 431, car controller 404, elevator controller 415, or fixture 450 can include a near-field communication chip (e.g., Bluetooth®, Wi-Fi, etc.) and a cellular data chip, as known in the art. In some embodiments, the computing system 437 may be configured to receive information over a network (wired in some examples or wireless in others), such as network 333 shown in FIG. 3. The information received over the network may be stored in the memory 43a (e.g., as data 443) and/or may be processed and/or employed by one or more programs or applications (e.g., program 441).

The computing systems 437 may be used to execute or perform embodiments and/or processes described herein, such as within and/or on the elevator controller 415, car controller 404, and fixtures 450 to enable a user to make service requests to an elevator system. To make such service requests, the computing system 437 of fixture 450 may communicate with the computing system 437 of the elevator controller 415, where the communication employs the daisy chain Ethernet network e.g., 333 as described herein.

Figure 5:
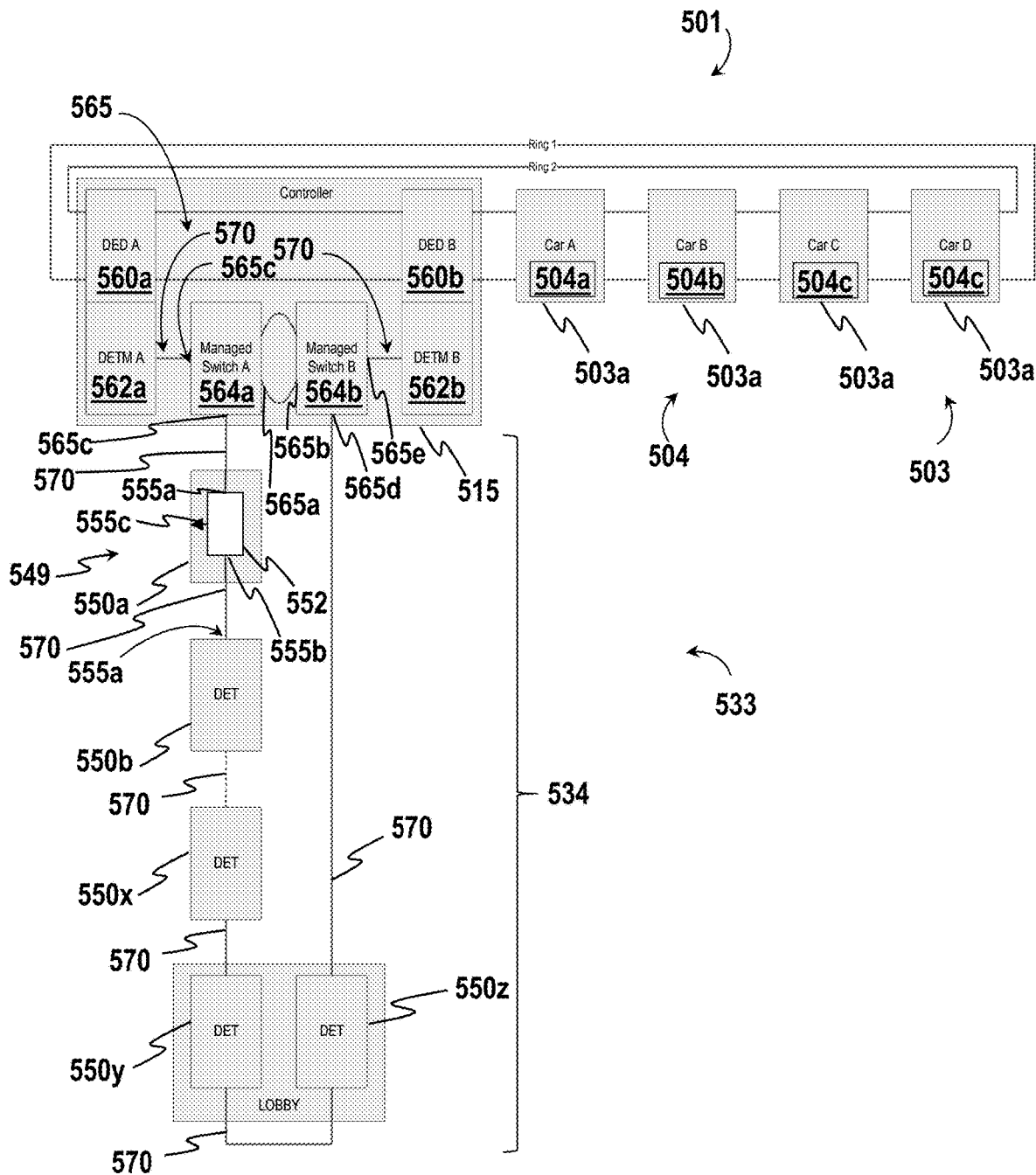
FIG. 5 is a simplified schematic diagram of an elevator system with a daisy chained communications network in accordance with an embodiment.

Turning now to FIG. 5, a simplified schematic illustration of an elevator system 501 employing a network communication system 533 in accordance with an example embodiment is depicted. The elevator system 501 may include one or more computing devices, such as an elevator controller 515. As described herein, the functions of the elevator controller 515 may also be partitioned. For example, in one configuration between an elevator controller 515 for controlling system operation and dispatching operations and a car controller operations associated with individual elevator cars 503. While not limiting, in the figure four elevator cars are depicted for illustration, shown in this figure generally, as 503 and more specifically as 503a, 503b, 503c, and 503d. It should be appreciated that while four elevator cars 503 are depicted for the purposes describing the embodiments, such depiction is merely for illustration. Essentially any number of elevator cars 503 are possible depending on the size, configuration, and needs of the building. Similarly, each elevator car 503 has an associated elevator car controller 504 shown once again generally as 504 and more specifically as 504a, 504b, 504c, and 504d corresponding to elevator cares 503a, 503b, 503c, and 50cd respectively. A plurality of fixtures shown once again generally as 550, and specifically as 550a, 550b, . . . 550x, 550y, 550z such as a kiosk, shown specifically as 550z, or hall call buttons and displays, laptop, tablet, etc. as described herein are employed and interconnected with the elevator controller 515.

The elevator controller 515, elevator car controllers 504, and fixtures 550 may include a processor, memory, and communication module(s), as shown in FIG. 4 and described herein. The fixtures 550, elevator car controllers 504 and elevator controller 515 (denoted in this figure specifically as DED 560a, 560b, and DETM 562a 562b and managed switches 564a 564b) each including executable instructions stored therein, for instance, as firmware to cause them to execute and implement various processes. As described previously the elevator controller, 515 and fixtures 550 include a communications module to implement one or more communication protocols as described herein, and may further include features to enable specifically daisy chain Ethernet communication therebetween and with the elevator controller 515. The fixtures 550 may further include a user interface (e.g., a display screen, a microphone, speakers, input elements such as a keypad or touch screen, etc.) as known in the art and described herein.

In an embodiment, the elevator system 501 employs the network communication system in a group Local Area Network (LAN) with one or more networks loops implemented with one or more implemented as a daisy chain 534. Two of the networks are operable to communicate between the elevator controllers 515, specifically DED A 560a and DED B 560b and the car controllers 504 (not part of this description, but shown for completeness). However, it should be appreciated that systems with fewer or more elevator cars 503 and car controllers 504 communicating with the elevator controller 515 are possible. While another is implemented as a daisy chain as described herein, and employed to facilitate communications between the elevator controllers 515, specifically, 560a, 562a and 560b, 562b via the managed switches 564a, 564b and the fixtures 550. It is also possible to use other communication architectures for elevator controller 515 to car controller(s) 504, e.g., a bus using CAN or a star using Ethernet or other serial point-to-point protocol. In addition, the elevator system 501 and more specifically the network communication system 533 can be configured as one or more local area networks (LAN) with multiple daisy chain 534 of fixtures 550 operably connected to the elevator controller 515. In an embodiment, each elevator controller 515 is configured with, but is not limited to, two independent halves, each half having a supervisory/dispatching controller denoted as DED 560a, 560b, in operable communication with the elevator car controller(s) 504. The dispatching controller portion 560a, 560b is also in operable communication with a terminal manager denoted DETM 562a, 562b and a managed Ethernet switch 564a, and 564b as well as power supplies for all internal components and the fixtures 550 on daisy chains 534 connected to the managed Ethernet switches 564a and 564b. The terminal manager(s) 562a, and 562b are each in operable communication with the managed Ethernet switch 564a and 564b respectively and with each other via the managed Ethernet switches 564a and 564b. The managed Ethernet switches 564a and 564b are also in operable communication with each other. Each managed Ethernet switch 564a, 564b in the controller 515 is configured with two ports that provide a redundant connection to the other managed switch. At any one time, one connection is active, and the second provides a backup communication path. In an embodiment, the communication is via a standard protocol such as Rapid Spanning Tree Protocol (RSTP).

In operation, the group supervisory/dispatching controller 560a, 560b assigns calls by users for the elevators to each of the elevator car(s) 503 depending on availability and other criteria to select the best possible elevator car 503 for each call and to ensure optimal system efficiency for the prevailing passenger traffic conditions in the building. More specifically the assignment is provided to the elevator car controller(s) 504 to then control the operation of individual elevator cars 503 including stopping at the requested and assigned floors. The terminal manager 562a, 562b manages the fixtures 550 (aka terminals) and routes information such as entered calls and assigned car information between the supervisory/dispatching controller 560 of elevator controller 515 and the fixtures 550.

The elevator system 501 implements the network communication system 533 for at least the fixtures 550 as an Ethernet LAN network configured in a daisy chain 534 structure as opposed to a star architecture as conventionally employed in the art. It should be appreciated, that while the described embodiments are presented with reference to a daisy chained implementation of an Ethernet network, there may be instances and portions of the network communication system 533 that employ a star type architecture as needed. The network communication system 533 comprises the entire network infrastructure that provides the interconnection between the terminal managers 562a, 562b and the fixtures 550, including the network components internal to the elevator controller 515, e.g., the managed Ethernet switches 564a and 564b.

The managed Ethernet switches 564a, 564b and the embedded Ethernet switches in the fixtures 550 operate at the data link layer (layer 2) of the Ethernet network. The managed Ethernet switches 564a, 564b and the terminal managers 562a and 562b control how individual Ethernet frames are processed and passed between ports shown generally as 565 on each managed switch 564a, 564b switch and from/between fixture(s) 550 operating as a source device generating frames on one port 565, to one or more destination ports. The managed Ethernet switch 564a, 564b learns the MAC addresses of devices generating frames on each port 565 by observing the source MAC address of incoming frames, thus forming a table associating a particular port to each learned MAC address. Incoming frames are routed to an outgoing port according to the destination MAC address contained in each frame, using the MAC address table. Any frames which have an unknown destination MAC address are flooded to all destination ports 565. For example, for communications between managed switch 564a to managed switch 564b from port 565a communicates to port 565b according to the MAC address for the managed switch 564b as described further herein and vice versa for messages communicated in the opposite direction.

In another example, communication of a frame from a DETM 562 to a fixture 550, for simplicity, if the sender is DETM 562a, and the destination is fixture 550b. In that case, the DETM 562a creates the frame containing its source MAC address, the destination MAC address of the fixture 550b, the frame payload and other information that constitutes a valid Ethernet frame. The DETM 562a sends that frame on its Ethernet port 565 and it is carried via Ethernet cable 570 to a port, specifically 565f, of managed switch 564a managed switch 564a examines the destination MAC address in the frame, and based on information it has learned in its MAC tables, determines that the frame should be forwarded out of its port 565c. The frame travels via cable 570 to port 555a of fixture 550b. The internal Ethernet switch 552 in fixture 550a then examines the frame, looks at its own MAC tables, and determines the frame should be forwarded out of port 555b. The frame travels via cable 570 to the port 555a of fixture 550b, where the internal Ethernet switch 552 of fixture 550b examines the destination MAC address and determines that the frame should be forwarded to the CPU of fixture 550b for processing by the fixture software.

If any intermediate device's Ethernet switch (e.g., 552 managed or internal) in this path hasn't yet learned the MAC address and port association for the frame's destination MAC address, then the frame will be flooded to all its ports 555. As the switch receives frames from devices on the network 534, its MAC table is gradually learned and will eventually reach a steady state where there is no flooding of frames required—this statement assumes the network topology and devices do not change, and no devices become stale and "age out" of the MAC table due to inactivity.

Similarly, the fixture(s) 550 (shown in the figure with respect to fixture 550a, also includes a communications module 549 such as or similar to communications module 449 (FIG. 4) that includes an internal Ethernet switch 552 that includes three switch ports shown generally as 555. A first and second switch ports 555a and 555b provide external connections and a third switch port 555c is internally connected to the onboard processor. Like the managed switches 564a, 564b, the internal Ethernet switch 552 controls how individual Ethernet frames are processed and passed between ports 555a, 555b, 555c on each fixture 550, operating as a source device generating frames on one port e.g., 555a to one or more destination ports e.g., 555b or 555c, according to the destination MAC address contained in each frame.

Continuing with FIG. 5, in an embodiment, each Ethernet switch, either in the managed Ethernet switches 564a, 564b and Ethernet switch in the fixtures 552, learns the MAC addresses of devices attached to and communicated to each port 565, 555 by extracting the source MAC address of frames entering the port 565, 555. By maintaining a table of learned MAC addresses and the corresponding port 565, 555 associated with them, the switches 564a, 564b or the embedded switches 552 in the fixtures 550 respectively, can forward incoming unicast frames to the appropriate transmission port 555, 565 according to the destination MAC address if it exists in the learned MAC address table. If an incoming unicast frame has a destination MAC address that is not found in the learned MAC address table, the switch 564 or the embedded switch 552 in each fixture 550 will forward the frame to all its other ports 565, 555 respectively, a process known as unicast flooding. Learned MAC addresses are also subject to an "aging" process which causes stale addresses to "age out" of the table after a selected period of time (for example, 5 minutes, for the Ethernet switches 564a, 564b of the elevator controller 515 and the embedded switch 552 in the fixtures 550) if no further frames from that source address are received.

Broadcast frames with destination MAC address FF-FF-FF-FF-FF-FF are forwarded to all active switch ports, as are most multicast frames with the least significant bit of the first octet of the destination address set to 1. For example, MAC address of 01-00-5E-00-00-00 to 01-00-5E-7F-FF-FF are multicast. In addition, it should be appreciated that there is also an IEEE standardized defined range of destination MAC addresses: 01-80-C2-00-00-00 to 01-80-C2-00-00-0F that are reserved and not forwarded by IEEE 802.1D and 802.1Q compliant bridges switches e.g., switches 564a, 564b implementing these protocols, i.e., they are treated as "link local". It should be noted that this distinction will prove beneficial as addressed at other points herein.

Continuing with FIG. 5, each fixture 550 provides a I/O devices 447 to implement a user interface as described herein with respect to FIG. 4 that an elevator passenger can utilize to enter a car call or destination floor into the elevator system 501, and to receive and convey the corresponding car assignments and other relevant information back to the passenger. Additional fixture 550 functionality may also be provided for installation, maintenance, prognostic and diagnostic purposes. The fixtures 550 are connected in a daisy chain 534 configuration using standard Cat5e copper Ethernet cables 570. Currently such cables are typically specified for a maximum allowable length of 100 meters, which determines the maximum distance between adjacent devices in each daisy chain 534; i.e., managed switch port 564a, 564b, to fixture 550, e.g., managed switch 564a to fixtures 550a; or fixture 550 to fixture 550, e.g., fixtures 550a to fixtures 550b. Advantageously, where longer distances are required, media converters and/or extenders can be used, though these do not impact the functionality of the daisy chains networks 534 themselves. Moreover, the number and expansion of the number of daisy chains 534 or number of managed Ethernet switches 564a, 564b is only limited only by the availability of spare ports on both of the managed Ethernet switches (e.g., 564a, and 564b). In addition, it is possible to use Ethernet extenders to increase the length of the daisy chain 534 and thus the building rise supported by the system. Moreover, it is also possible to attach a number of fixtures in selected locations in a star-wired configuration to facilitate easier wiring for example with lobby fixtures or when there are several fixtures in close proximity.

Figure 6:
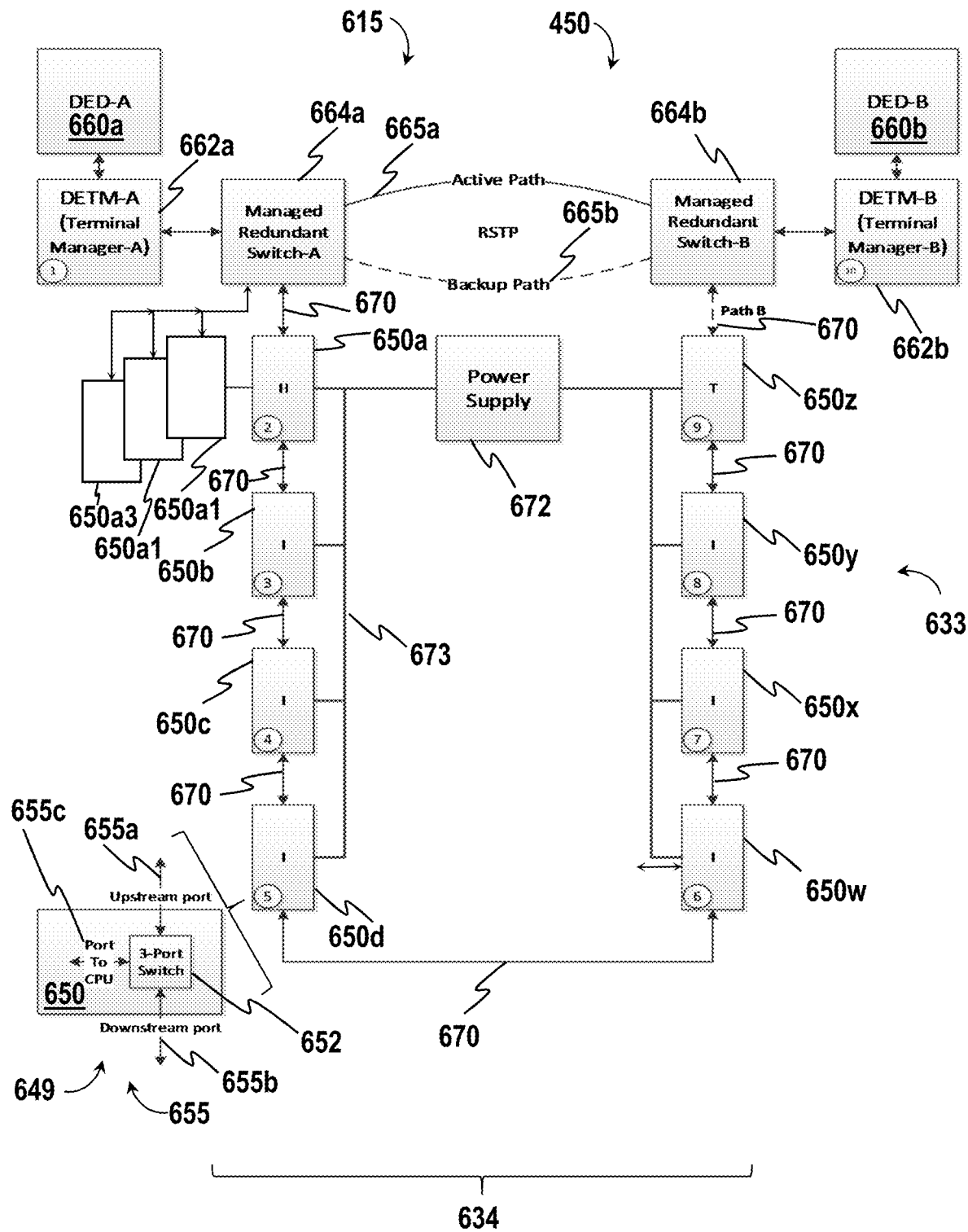
FIG. 6 is a simplified schematic diagram of an daisy chained communications network in accordance with an embodiment.

FIG. 6 depicts the basic daisy chain network 634 arrangement, for the network communication system 633 as well as components of the elevator controller 615. An expanded view of the daisy chain network 634 is depicted to provide further details. In this depiction, the controllers 504 and connections there to for the elevator cars e.g. 503 are omitted for simplicity. In an embodiment the fixture(s) 650 also include a communications module shown generally as 649 such as communications module 449 (FIG. 4) that includes an internal Ethernet switch 652 (See FIG. 6) that includes three switch ports shown generally as 655. A first and second switch ports 655a and 655b provide external connections and a third switch port 655c is internally connected to the onboard processor 445 (FIG. 4). In addition to providing the passenger interface and installation & maintenance functions as described herein, the fixture may include software or firmware responsible for configuring, monitoring and managing the functionality of the Ethernet switch(s) 664a, 664b to provide the functionality required to support the daisy chain 634 configuration of the network communication system 633.

In an embodiment, one fixture 650, in this instance 650a, in each daisy chain 634 is designated as a "Head" (also denoted node 2 in the figure). The first port e.g. 655a of the Ethernet switch 652 of the Head fixture 650a is attached to managed Ethernet switch 664a, while the second port e.g., 655b is attached to the next "downstream" fixture 650b in the daisy chain 634. Similarly, one fixture in this instance 650z in each daisy chain 634 is designated as a "Tail" (as denoted as node 9 in the figure). The second port, e.g., 655b of the "Tail" of the Ethernet switch 652 of that fixture 650z is attached to the previous "upstream" fixture, (in this instance 650y) in the daisy chain 634, while the first port, e.g., 655a of the "Tail" fixture 650z is attached to managed Ethernet switch 664b. Consistent with the description of the "Head" fixture 650a and the "Tail" fixture 650z, for the purpose of simplicity and consistency, the "upstream" port of any fixture 650 is always the one that is closest to managed Ethernet switch 664a, and the "downstream" port of any fixture 650 is the one that is closest to managed Ethernet switch 664b. However, it should be readily understood that other configurations for the daisy chain 634 are possible. Moreover, in an embodiment, the configurations and assignments of the upstream and downstream ports 655 may be made automatically and dynamically. With respect to FIG. 6, the notion of 655a as the "upstream port" and 655b as the "downstream port" (shown in lower left corner) is not fixed to a particular physical port, and will depend on the way Ethernet cables 670 are attached to fixture 650. In fact, in another embodiment, the direction and definition/designation as an "upstream" port 655 or downstream" port 655 is determined automatically in the daisy chain manager software operating on each fixture 650. For example, in an embodiment the actual fixture software that handles most of the user-facing features of the fixture, i.e. entering calls, displaying assignments, installation and maintenance tasks, while, the daisy chain manager portion handles the embedded Ethernet switch 652, maintains the daisy chain network 634 as described herein, and also provides some information about the daisy chain to the fixture software for installation & maintenance.

All other fixtures 650 in each daisy chain 634 are designated as "Intermediate" (e.g., nodes 3 through 8 in the figure denoted as 650b, 650c, 650d . . . 650w, 650x, and 650y. Each of the "Intermediate fixtures 650b, 650c, 650d . . . 650w, 650x, and 650y may be connected in a fashion similar to that employed for the "Head" fixture 650a and "Tail" fixture 650z. However, advantageously, unlike the "Head" fixture 650a and the "Tail" fixture 650z, the ports 655 of the switch 652 of any "Intermediate" fixture 650 need not have, a fixed designation of being attached to its upstream or downstream neighbor fixture 650. This eases field setup. It should also be appreciated that in selected embodiments, there may be instances where it is acceptable to not have a complete daisy chain, i.e., not fully looping from one managed switch 664 to the other managed switch 664. In this instance, the daisy chain 634 may just be one long chain that is not redundant. Such a configuration may be acceptable in applications without the need for communication network redundancy. However, during failure scenarios e.g. faulty Head fixture, and the like, operation with a complete daisy chain attached at both ends to a managed Ethernet switch 664 may be advantageous to provide operation until the faulty fixture 650 is replaced.

In some embodiments, it may be desirable to have a number of fixtures 650 star-wired to a network switch i.e., a group of fixtures 650a1, 650a2, 650a3 connected in a star, with each one connected to a port on the managed switch 664, which may be desirable when several fixtures are close to one another, such as in or near a building lobby. Alternatively, one port on the managed switch 664 could be connected either directly or via an Ethernet extender to another (not shown) managed switch locate in closer proximity to the fixtures 650a1, 650a2, 650a3, especially in cases where a single run of Ethernet cable exceeds the 100 m distance limitation. The star connected fixtures 650a1, 650a2, 650a3 are referred to as "Standalone" devices. Failures of standalone fixtures or the cabling that connects them do not affect other fixtures. Likewise, failure of managed Ethernet switches 564, or in the Ethernet cable back to the elevator controller 615 will result in the loss of the entire set of fixtures connected via that segment of the network 633. The functionality of standalone devices will be described separately.

Continuing now with FIGS. 5 and 6, now that the interconnection of the of the components of the network 633 has been described, it is advantageous to turn to the methodology of operating the communication network 633 employing the daisy chain 634 in accordance with an embodiment.

In order to simplify the descriptions that follow, it is assumed that the external Ethernet ports 655 of each fixture 650 are in the "Forwarding" state unless specifically stated otherwise. "Forwarding" means that for a particular port 655 the switch 652 is learning MAC addresses and forwarding frames upstream/downstream or to its processor according to the destination MAC address. "Blocking" means that for a particular port 655 the switch 652 is not learning MAC addresses, and is discarding all frames, with the exception of specially crafted frames related to daisy chain management described hereafter; these are forwarded from the external ports e.g. 655a, 655b to the port 655c and on the respective processor for the fixture 650.

Each daisy chain 634 of the communication network 633 operates and is managed independently of the other daisy chains 634, i.e., a change of state in one daisy chain 634 does not impact the operation of any other daisy chains 634 in the communication network 633. This requires all chain-related messaging to include a daisy chain ID attribute. Moreover, at no time should any daisy chain allow messages to enter the chain via the Head (from managed Ethernet Switch A, 664a) and exit the chain via the Tail (to managed Ethernet switch B, 664b), or vice versa. This would result in an undesirable loop in the network topology where broadcast frames could circulate endlessly, being received by devices that may generate additional frames and eventually overwhelm the network's capacity.

To address these concerns and ensure maintaining satisfactory communication, a redundant inter-switch link having an active link denoted 665a and a backup link denoted 665b is provided between the managed Ethernet switch 664a and managed Ethernet switch 664b. In an embodiment, if both the active inter-switch link 665a and backup inter-switch link 665b between managed Ethernet switch A 664a and managed Ethernet switch B 664b is broken, the daisy chain(s) 634 are not be used to route messages. In some embodiments, loss of both inter-switch links may be ignored as a fault tolerance measure. That is, in some instances, it may be advantageous to permit some communication on selected daisy chains 634 as opposed to permitting none. To that end, it is preferable to avoid having "controller local" communications passing through the daisy chain 634 as an alternative data path if such a failure occurs. This ensures that the data path through the daisy chain of fixtures is not overwhelmed by high-volume traffic between DETMs 662 in the controller, or from devices external to the controller 615 that are communicating with the DETMs 662 (via a port on one of the managed switches 664). This constraint can be very important if the data rate of the Ethernet for the daisy chain 634 is lower (for example on the order of 10 Mbit/sec) than that of the switches 664a, 664b, which might readily support 100 Mbit/sec or even 1 Gbit/sec data rates. At higher rates for the managed switches, the bandwidth provided through a daisy chain 634 could readily become overwhelmed, leading to dropped frames.

Figure 7:
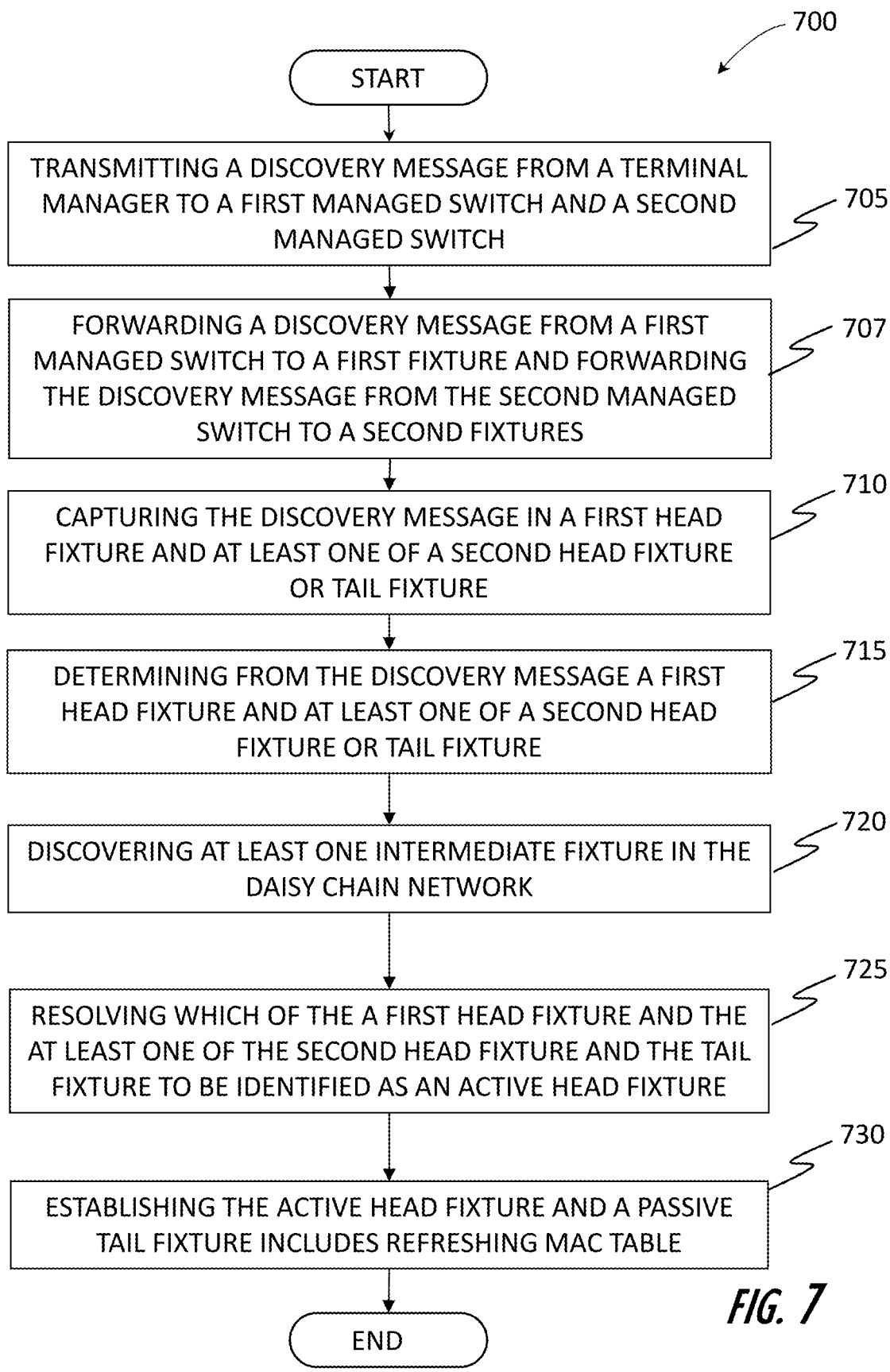
FIG. 7 is a simplified flowchart of a method establishing a daisy chain communication system in accordance with an embodiment of the present disclosure.

Turning now to FIG. 7, depicting a method of interconnecting a daisy chain communication network without looping is depicted. In an embodiment the method 700 is employed to interconnect the controller apparatus 660, 662 and managed switches 664 with the fixtures 650 to create a functional system. It should be appreciated that in order to build the communication network 633 at least one active terminal manager 662 (e.g. server) and one active fixture 650 (e.g., client) are needed with at least one functional network connection provided by at least one active managed switch 664. At initial start up, as the fixture 650 software executes, at least one of the external Ethernet ports 655 is predetermined to be in the blocked state to ensure that loops are not formed in the daisy chain 634 during the period between when power is applied and when the software takes over control of the fixture's embedded Ethernet switch 652. Similarly, the other port 655 is in a forwarding state to facilitate identification of upstream or downstream ports to facilitate initialization. In an embodiment, Port 1 e.g., 655a is set to Blocked state and Port 0 is set to Forwarding state on initialization. Blocking both ports is preferably avoided at all times to ensure at least one open port for debugging, software update, etc. when needed.

To initiate communications, as depicted at process step 705 the terminal manager 662, operating as a server, periodically broadcasts a specifically crafted End Node Discovery message, which is sent with a local source MAC address instead of the universally unique MAC address as defined by the IEEE 802.3 standard. This ensures that the MAC address tables of the managed Ethernet switches 664 and the embedded Ethernet switches in the fixtures 652 will always contain information allowing any frames addressed to the universally unique MAC address of the terminal manager 662 to be forwarded using the active path through the daisy chain.

At 707, the End Node Discovery message is forwarded from the first managed switch to a first fixture and forwarded from the second managed switch to a second fixture. In an embodiment, these messages when received by the fixture 550 software are used to identify the "active head" or "active tail" fixture. By virtue of the fixture having local configuration parameter data in non-volatile storage e.g. FLASH memory, or some other means that allows the software to determine that it is a Head, Tail, Intermediate or Standalone device A fixture determines it is a tail by virtue of discovery. In an embodiment, any fixture that receives End Node Discovery messages (because of the way they are captured by the first receiving device) must be located at the end of a daisy chain. That makes such devices either a Head or a Tail (if other fixture devices are attached) or else Standalone (no other device attached to the devices the second network port)

In the discovery case, the devices start off at the end of the chain thinking they are Head devices. When the chain grows to the "meet in the middle" point, a decision has to be made about which device becomes a Head and which must change to be the Tail. That is done by looking at the MAC addresses of both fixtures and since they are guaranteed to be universally unique, one will have a higher value than the other (if compared numerically). So we choose a rule, e.g. the highest MAC address is Head, and the other device becomes the Tail.

By virtue of some other means whereby the fixtures know which managed switch they are connected to, using some frames/messages that originate from the switch, using an industry standard protocol such as LLDP (Link Layer Discovery Protocol). If a fixture 550a knows it is attached to managed switch 564a, we can create a rule that all fixtures attached to managed switch "A" 564a will always have the role of Head. Similarly, we can have a rule that all fixtures attached to managed switch "B" 564b are Tail devices, i.e. fixture 550z. Any other switches in the chain, which will not receive LLDP messages from the managed switches 564 must therefore be Intermediate devices. In this case, any Standalone devices are the same as a Head or Tail with no attached downstream devices.

The communications module 649 of a fixture 650 will capture End Node Discovery messages and process their contents, i.e., never passing the contents if the network port (e.g., 655) on which the fixture 650 receives the message is in the blocked state (by virtue of software and/or Ethernet switch configuration settings). Message processing is handled by the processor 445. The communications module is really the embedded Ethernet switch and associated physical interface hardware. The fixture 650b, 650c, 650d, and so on, listens for the fixture 650a End Node Discovery message sent by the fixture 650a, 650b, 650c, and the like as depicted at process step 710. Only the fixtures at the end of the chain, in this case 550a and 550z will see the End Node Discovery messages. They are always captured by the first Ethernet switches settings and "trapped" to the processor of that fixture. This will happen irrespective of whether the switch port attached to the managed switches is blocked or forwarding.

Continuing with FIG. 7, the method 700 continues at process step 715, where the role, of a fixture 650 in daisy chain 634, i.e., Head, Tail, Intermediate, or Standalone is determined by a configuration parameter. In another embodiment, various schemes could be employed to use Link Layer Discovery Protocol (LLDP) to automatically detect Head and Tail fixtures 650. LLDP is a protocol designed for identifying network ports on devices, e.g. device name, port name, port number. In addition, an ID to identify each unique daisy chain 634 of the communication network 633 is also determined by a configuration parameter. In an embodiment select values are employed to identify other non-daisy chain configurations. For example, a value of "255" meaning "Standalone", yet a value of "0" means "Unconfigured". Once the fixture 650 receives the End Node Discovery message, both "Head" and Tail fixture e.g., 650a and 650z respectively can ascertain and identify their upstream and downstream ports 655 from examining their respective MAC tables to identify the port 655 that the End Node Discovery message arrived on. Because the End Node Discovery uses a specially crafted source MAC address (the local source MAC of the terminal manager 562 that sent the frame), and because this frame is captured by the first fixture in each chain, it will only have one port associated with it in the MAC table if the receiving port was in the forwarding state, or else it will be absent if the port was in the blocking (non-learning) state. Continuing with the process 700, at process step 7XX, upon identification of its upstream and downstream ports 655, "Head" fixture e.g., 650a first sets its downstream port to Blocked state then its upstream port to Forwarding state. Likewise, upon identification of its upstream and downstream ports, a "Tail" fixture e.g. 650z sets its upstream port to Blocked state then its downstream port to Forwarding State. In an embodiment, "Head" and "Tail" fixture(s) 650 further broadcasts a DCM Network Status message at a selected interval and further, a "Head" fixture e.g., 650a may broadcast a heartbeat message steered downstream at a selected interval.

Upon receiving "Head" fixture e.g., 650a heartbeat message, "Tail" fixture e.g., 650z can readily identify an IP address associated with the Head fixture 650. The Tail fixture can then respond with a unicast heartbeat to the Head fixture. Note that the Tail will not be able to receive Head's heartbeats until the links in the daisy chain have been completely established.

Continuing with FIG. 7, and the method 700, at process step 720, the establishment of links throughout the daisy chain can be started by the Head and the Tail fixture 650 by sending a fixture 650 Link Status Discovery message to their adjacent fixtures 650. The fixture 650 Link Status Discovery message can be periodically sent until a fixture 650 Link Status Reply message is received. Both the Head fixture 650 and the Tail fixture 650, each set its Role byte in the message to indicate its role as a Head or a Tail, and set its Active Head/Tail byte to "H"/"T" if it is active.

A particular fixture 650 that is not a Head fixture e.g. 650b can determine an Active Head by monitoring communications in the chain 634. For example, if the heartbeat from the Head fixture e.g., 650a is being received, it indicates that the upstream link for the Head fixture 650a is operational and its upstream port is in Forwarding state, while the fixture 650's upstream port has been discovered via Link Status Discovery. Similarly, a fixture can be identified as the active Tail by ascertaining if the particular fixture's downstream link is up and downstream port is in Forwarding state and the downstream port has been discovered via End Node Discovery. Each fixture periodically broadcasts a Network Status message to other fixtures 650 and to the terminal managers 662. The message contains various status information that is used during operation of the daisy chains 634 and for diagnostic purposes, including but not limited to the following: the fixture's MAC address and currently assigned IP address, the fixture's 650 role (Head/Tail/Intermediate/Standalone), the status of each external Ethernet port (i.e. link up/down, port forwarding/blocking, port discovered/undiscovered), the MAC address of immediate neighbor fixtures (if any), whether the fixture is receiving DETM Alive messages, Head and Tail Status messages and whether the fixture is requesting other fixtures 560 to immediately broadcast their own Network Status message.

A fixture 650 e.g. 650y that is not a Tail, can readily determine an Active Tail fixture, exists in its daisy chain e.g., 650z by monitoring communications in the chain 634. For example, if the heartbeat from Head fixture e.g., 650a is not being received and the particular fixture 650 Network Status from the Tail indicates that both of Tail's links are up and both ports are in Forwarding state. Finally if the particular fixture's 650 downstream port has been discovered via Link Status Discovery. Upon receipt of the fixture 650 Link Status Discovery message, the fixture 650 that sees an Active Head sets its downstream port 655 to Blocked State, and then set its upstream port 655 to Forwarding State. The upstream port 655 should be where the fixture 650 received the Link Status Discovery message from the adjacent fixture that is indicating it sees an Active Head (this adjacent fixture could be the Head itself if there are no intervening fixtures 650). This prepares the upstream port 655 to send and receive messages while blocking the downstream port 655 to prevent network loop.

Upon receipt of the fixture 650 Link Status Discovery message, the previously undiscovered fixture 650 that sees an Active Tail sets its upstream port to Blocked State, and then set its downstream port 655 to Forwarding State. The downstream port 655 should be where the fixture 650 received the Link Status Discovery message, either directly from the Tail or from an adjacent fixture connected to the discovered portion of the daisy chain that is attached to the Tail. This prepares the downstream port to send and receive messages while blocking the upstream port 655 to prevent network loop.

In an embodiment, the undiscovered fixture 650 responds to the fixture Link Status Discovery message with a fixture 650 Link Status Reply message. Upon receiving a fixture 650 Link Status Reply message, the fixture 650 that sent the Link Status Discovery message sets their receiving port 655 to Forwarding state. This prepares the port 655 to send and receive messages. This effectively increases the length of the discovered portion of the daisy chain 634 by one additional fixture 650.

An "Intermediate" fixture 650 can be discovered by a fixture 650 that is one of a Head, Tail, Intermediate that sees an Active Head, and an Intermediate that sees an Active Tail. After being discovered, the Intermediate fixture 650 broadcasts a Network Status message every 10 seconds. Though, it will be appreciated that the time could vary. The Head and the Tail will also broadcast Network Status messages periodically.

Upon setting one of its ports 655 to Forwarding after the Link Status Discovery and Link Status Reply exchange, fixture 650 proceeds to send a fixture 650 Link Status Discovery message on the other port to its adjacent fixture 650. However, the fixture 650 sends this message only if it sees an Active Head or an Active Tail. This condition ensures that links in the daisy chain are established one fixture 650 at a time starting from the 2 ends of the chain, i.e., at the Head fixture, e.g., 650a and at the Tail fixture e.g., 650z.

Continuing with FIG. 7, and the method 700, at process step 725, the sequence of Link Status Discovery and Link Status Reply exchange between fixture(s) 650 as described herein continues until a final pair of adjacent fixtures such as 650w and 650x needs to establish a link. That is, at a certain point in the growth of the daisy chain 634, one client or fixture e.g., 650w will have a complete path to the Head fixture, and its neighbor e.g. fixture 650x will have a complete path to the Tail device e.g. fixture 650z. As a result, this means there is only one link in the daisy chain 634 between fixture 650w and fixture 650x to complete the daisy chain 634 and identification of each fixture 650. To address this condition, if fixture 650 e.g., fixture 650x receives a Link Status Discovery message on one of its ports 655, e.g., 655a, the fixture 650 is identified as being in a negotiation state where a Link Status Discovery received at its other port 655 e.g. 655b is ignored until negotiation on the first port 655a is complete. It should be appreciated that either fixture 650w or fixture 650x could be the first to send the Link Status Discovery message.

If the fixture 650 denoted A for example, receiving the Link Status Discovery message on one of its ports 655, sees from the message an indication that the fixture 650 denoted B sending the message is connected to an Active Tail connection, the first fixture 650 will defer the discovery process in recognition of the potential formation of a network loop. As a result, the second fixture, B, is the one that is connected to the Tail, and will send a Time To Block message to the Tail fixture 650 e.g., 650z. The Tail fixture 650z will block its network port attached to the server—e.g., managed switch 664b, and respond with a Time To Block Reply message back to fixture 650 B. The tail fixture 650z is now configured to be Passive in the communication network 633. In addition, The Tail fixtures 650z sends an additional Network Status message requesting all clients e.g., fixtures between it and the second fixture 650 B to flush their MAC tables to re-start the learning of MAC addresses for devices attached to each client's ports. This has the effect of updating the MAC tables in each fixture 650 as the message passes through it, as well as updating the MAC tables in managed switch A 664a and managed switch B 664b. The second fixture 650 denoted B will again send a Link Status Discovery message indicating the Tail's connection is now Passive. The first fixture 650, e.g. client A send a Link Status Reply. Both the first fixtures 650, e.g., Client A and the second fixture 650 e.g., Client B unblocks the ports 655 between themselves. The daisy chain is now completed from Head to Tail with only the Head fixture 650 connection to the server network infrastructure e.g., managed switch 664a is Active. The Tail is Passive as depicted at process step 730.

In another embodiment an alternative scheme for configuring/identifying the role of fixtures 650, e.g., client devices may include a process where during the "initial" and "subsequent growth" phases of the daisy chain 634, devices e.g., fixtures 650 at both ends e.g., connected to either managed switch 664a or 664b and receiving End Node Discovery messages from at least one terminal managers 662 are considered to be potential Head fixtures 650. In this situation, during the "meeting in the middle" phase as described herein, the Head fixture 650 with the lowest MAC address (determined by data received during the Link Status Discovery & Link Status Reply message exchange), will determine that it should be identified as the Tail of this particular daisy chain 634. MAC addresses are universally unique. That is a requirement of IEE 802.3 Ethernet networks. So we can use the value of the MAC address as a "tie breaker". Alternatively we could exchange some other message data that is random in nature, a bit like playing "rock, paper, scissors" to determine a "winner": that will become Head and a loser that will become Tail. In this situation, both the first fixture 650 e.g., Client A and the second fixture 650 e.g., Client B recognize the conflict immediately, and the determination of which should send a Time To Block message occurs seamlessly based on the MAC addresses. Any fixture device 650 which does not receive an End Node Discovery message is assumed to be an Intermediate device. In this instance, the Daisy chain ID is not configured as a parameter, but is based on a combination of the MAC addresses of the Head and Tail devices, which by definition are unique in an IEEE 802.3 Ethernet network.

Fast aging is a mechanism to quickly age out and refresh the MAC table entries of a fixture's 650 internal switch 652. In an embodiment, the fast aging and MAC table refresh sequence may be implemented when the Tail fixture 650 e.g. 650z receives the heartbeat signal from the Head fixture 650 for the first time during initial power-up or the first time after the last Head heartbeat timeout. In another embodiment, another condition for refreshing the MAC table is that the Tail fixture 650 does not receive a heartbeat for more than 3 cycles, e.g., 900 ms, or the Tail receives heartbeat from the Head fixture with the Head's upstream port down or in Blocked state, or finally the Tail's downstream link is lost.

The described sequence of fast aging and sending a Network Status message has the effect of updating the MAC tables in each fixture's 650 internal switches as the message passes through it, as well as updating the MAC tables in Managed Switch A 664a and managed switch B 664b to recalibrate the path to each fixture 650 in the daisy chain 634.

Ensuring that the MAC tables in the managed switches will continue to route frames to the correct ports to get to fixtures 650 in the daisy chain, in spite of breaks in the chains, is crucial.

Use of a modified source MAC address when a server sends the End Node Discovery messages. This ensures that the MAC tables in the server-end network devices are still able to correctly forward messages from clients to servers. The servers (terminal managers) have to use the modified source MAC address for End Node Discovery, otherwise the MAC tables in the Ethernet switches would get corrupted. We saw this during development, where at one point while growing the chain, the MAC tables would say that the path was via one port, but then it would change, when another message was received on a different port.

Server-initiated discovery of Head/Tail end nodes to "kick off" the daisy chain formation process, using a modified source MAC address. Because the managed switches are unaware of the existence of the daisy chains, they are effectively "non-participatory" in the overall process. This allows us to use commercial managed Ethernet switches, rather than having to design our own devices.

While we proposed LLDP as one way of identifying Head and Tail ports, some cybersecurity experts believe that LLDP should be turned off. Other methods rely only on devices in the chain, but this limits the ability to do auto configuration of daisy chains. Link-by-link discovery of each adjacent client using specially-crafted messages containing a destination MAC address that can "push through" an otherwise blocked network port and be trapped to the CPU of the client. When a port is blocked, the embedded Ethernet switch will not forward frames arriving on that port to other ports, e.g. to the CPU of a fixture 650. This approach allows us to discover devices on both externally-facing network ports on each fixture 650, without being concerned about a network loop occurring. One port is always forwarding and the other is blocking during discovery. If the End Node or Link Status Discovery message arrives on a blocked port, we have a sequence that unblocks that port, but only AFTER the other port is blocked first, again to ensure a loop-free network.

But we can configure the switch so that some frames with specially crafted MAC destination MAC addresses will still be forwarded to the fixture's process even if the port is blocked to other frames with "normal" destination MAC addresses.

Coordination aspects for the final link when "meeting in the middle", in particular the flushing of MAC tables to ensure all clients forward messages using the one active path to the servers.

No need for "topology change" broadcast messages as each link in the chain is added. In protocols like IEEE Spanning Tree Protocol (STP), a change in topology results in topology change notification messages rippling through all intermediate devices.

As the chain grows, the only devices that care about this are the devices at the point where growth is happening, except when we get to the "meet in the middle" condition where it's necessary to tell devices to flush their MAC tables as the active path via the Tail is being deactivated (and all traffic will flow through the Active Head).

In a system with multiple daisy chains, changes in one chain generate no messages that have an impact on the other daisy chains. We use a daisy chain ID, and use steered Head Heartbeat messages that only flow into a chain (downstream) and will not "escape" at the Tail end (which is blocked). Also can auto-identify all our Head and Tail devices (as described in [0067], we do save a lot of configuration compared with STP/RSTP/MST managed networks. That is probably something we could claim.

When all communication network 633 components are properly connected and working, and their network ID and MAC addresses have been established via method 700, the communication system 633 is ready for communication. The state of the communication system 633 is such that the link between Managed Switch A 664a and Managed Switch B 664b in the controller 615 has one active port pair 665a and the other port pair 665b is in a backup state, it should be appreciated that the specific ports 665 selected for the active and backup role is not important. In addition, the Ethernet link between each fixture 650 and its respective directly-connected Managed Switch 664a, 664b For an intact connection there obviously needs to be a connected Ethernet cable, but there must also be an Ethernet port link that is up (this is part of the Ethernet design), and the devices need to have their hardware powered up with software running.

The terminal manager 662 operates as follows: Each terminal manager 662 sends a DETM Alive message via UDP to the local IP network broadcast address (all 1's address) every 1 second. This message is intended to be received by all fixtures 650 on all daisy chains.

Each DETM sends a DETM End Node Discovery message to the local IP network broadcast address (all 1's address) every second. The destination MAC address of this message is specifically set to 01-80-C2-00-00-30, (though it could be any crafted address so that it is "trapped" and forwarded to the CPU by the first fixture 650 connected to the end of each daisy chain, i.e. received only by the corresponding Head and Tail of each daisy chain.

The fixture 650 operates as follows: Each Head fixture 650 places its "upstream" port to Managed Switch A in the Forwarding state. Its "downstream" port also is in the Forwarding state.

Each Tail fixture 650 places its "downstream" port to Managed Switch B in the Blocking state. Its "upstream" port is in the Forwarding state.

All Intermediate fixture 650(*s*) has both external ports in the Forwarding state. This allows communication to and from each fixture 650 in the network.

Each fixture 650 monitors the Ethernet link status of both its external ports every 500 milliseconds. For a link to be considered up, the link should have been up for 4 consecutive cycles (2 seconds).

Each fixture 650 monitors whether it is receiving DETM Alive messages from each DETM. If a DETM Alive message from a specific DETM is not received for more than 3 seconds, then that DETM be considered to be offline.

Each Head and Tail fixture 650 monitors whether it is receiving DETM End Node Discovery messages from each DETM. If a DETM End Node Discovery message from a specific DETM is not received for more than 3 seconds, the connection to that DETM via the nearest directly-connected Managed Switch (i.e. Managed Switch A for the Head and Managed Switch B for the Tail) is considered to be lost.

Because of the way this message is to be "trapped" directly to the CPU of the first fixture 650 it encounters, it can only be received by the fixtures 650 closest to the managed switches, i.e. Head or Tail, and not passed through the Intermediate fixtures 650 in each daisy chain. A Head or Tail that is not receiving sM End Node Discovery messages from a particular DETM may still be able to communicate with that DETM via the "other" end of the daisy chain, i.e. it should still be receiving DETM Alive messages by that path. Because of the introduction of Ethernet repeaters into the daisy chain network architecture, the fact that the CPIB V2's Ethernet link state for the managed switch-facing port is up is insufficient to prove that messages to the DETM will arrive.

Each fixture 650 monitors its neighbor fixture 650 on both ports using the Heartbeat message for Head fixture 650 and fixture 650 Network Status message for all other types of fixtures 650.

The fixture 650 blocks its port if the neighbor fixture 650 on that port timed out.

Each fixture 650 monitors whether it is receiving fixture 650 Network Status messages from the Head and Tail fixture 650 of its daisy chain.

Each fixture 650 broadcasts a fixture 650 Network Status message every 1 second, with the contents reflecting the latest status as collected above.

Each Head fixture 650 steers a broadcast heartbeat downstream.

Each Tail fixture 650 sends a unicast heartbeat to the Head fixture 650 as long as Head heartbeats are being received.

If Head heartbeats are not received for 900 ms (3 missed heartbeats), Tail stops sending its unicast heartbeats.

The normal flow of frames into each daisy chain 634 takes place through Managed Switch A, then down each chain 634 from the Head fixture e.g., 650a to Tail fixture e.g., 650z. A frame from fixture 650a would enter Managed switch A and then go down the appropriate daisy chain(s) 634 based on the destination MAC address. A frame from DETM B would go through Managed Switch B, across one of the RSTP-controlled links to Managed Switch A, and then down the appropriate daisy chain(s). Packets originating from a fixture 650 destined for one of the DETMs would travel via the reverse path.

If an Intermediate fixture 650 receives a DETM End Node Discovery message, this indicates either a misconfiguration of the fixture 650 role, or potentially that the Head or Tail fixture 650 has been removed and replaced by a connector coupling its upstream and downstream Ethernet cables. The fixture 650 logs an error when this happens. Future—Consider dynamically identifying Head and Tail rather than using configuration settings, and select the Head according to which fixture 650 has the lowest MAC address.

Each DCM monitors the Ethernet link status of both its external ports every 500 milliseconds. This monitoring addresses a failure and recovery mechanism of the daisy chain.

Periodic monitoring of the link captures the failure case of a single or both links going down. Example cases of both links going down are fixture 650 losing power, fixture 650 restarting, Ethernet cables on both ports being disconnected or damaged. Similarly, example cases of a single link going down are Ethernet cable on one of the port being disconnected or damaged, neighbor fixture 650 on one port going down (losing power, restarting).

DCM determines link status recovery only if 4 consecutive cycles of link status check shows that link has recovered. This ensures that link is stable and has truly recovered. DCM determines loss of link immediately if loss of link is detected.

The following sequence of events takes place when a loss of link is detected by a Head or Intermediate on either of its ports.

The port whose link is lost is set to Blocked state. However, if the adjacent port of the fixture 650 is already in Blocked state, the port is not be set to Blocked state (rationale: there needs to be one open port for debugging, software update, etc. when needed).

The port whose link is lost is set to 'Undiscovered' state.

The neighbor fixture 650 associated with the port is unassociated and an updated DCM Neighbor Status message is sent to the fixture 650.

If Head's downstream link or an Intermediate's either link is lost, Head heartbeats will not be received by the Tail.

Upon losing head heartbeats for 900 ms (3 consecutive heartbeats), Tail sets its downstream port to Forwarding state.

The fast aging and MAC table refresh sequence as described in the section Fast Aging and MAC Table Refresh is performed.

If Head's upstream link is lost, Tail will receive Head's heartbeat with the information of Head's upstream link being down. Tail sets then its downstream port to Forwarding state.

The fast aging and MAC table refresh sequence as described in the section Fast Aging and MAC Table Refresh is performed.

Tail stops sending its heartbeats targeted to Head.

The following sequence of events takes place when a loss of link is detected by a Tail on either of its ports.

If the upstream port's link is lost, the downstream port is set to Forwarding state to allow communication with the DETM via the downstream path.

If the upstream port's link is lost, the downstream port is set to Discovered state to allow communication with the DETM via the downstream path.

The fast aging and MAC table refresh sequence as described in the section Fast Aging and MAC Table Refresh is performed.

If the upstream port's link is lost, the Tail stops sending its heartbeats to the Head.

The port whose link is lost is set to Blocked state. However, if the adjacent port of the fixture 650 is already in Blocked state, the port is not set to Blocked state (rationale: there needs to be one open port for debugging, software update, etc. when needed).

The port whose link is lost is set to 'Undiscovered' state.

The neighbor fixture 650 associated with the port is unassociated and an updated DCM Neighbor Status message is sent to the fixture 650.

The following sequence of events takes place upon Head's detection of its downstream link recovery.

Head initiates periodic Link Status Discovery message on its downstream port.

When Link Status Discovery is received from the Head, Head's neighbor fixture 650 will have an Active Tail. This will therefore follow the Time to Block and Time to Block Reply message sequence as described in the section Fast Aging and MAC Table Refresh. This sequence results in the daisy chain link being complete with Tail's downstream port in Blocked state.

The following sequence of events takes place upon Head's detection of its upstream link recovery.

Head processes the next DETM End Node Discovery message to allow discovery of its upstream link.

Upon receiving the End Node Discovery message, Head sets its downstream port to Blocked state regardless of if the port has already been discovered or the port never failed. Blocking of the downstream port upon link recovery ensures that a network loop is not created.

The upstream port that was recovered is then set to Forwarding state.

DCM Link Status Discovery message is sent to the downstream port to rediscover the blocked downstream port.

When Link Status Discovery is received from the Head, Head's neighbor fixture 650 will have an Active Tail. This therefore follows the Time to Block and Time to Block Reply message sequence as described in the Fast Aging and MAC Table Refresh. This sequence results in the daisy chain link being complete with Tail's downstream port in Blocked state.

In both the above cases, once the daisy chain link is complete, Tail is able to listen to Head's heartbeats. This triggers the fast aging and MAC table refresh sequence as described in the section Fast Aging and MAC Table Refresh is performed. Tail then starts sending its heartbeats to Head after receiving head heartbeats.

Recovery of Link detected by Intermediate

DCMs initiates a link discovery process on the port that detected recovery of a stable link.

As mentioned previously, link discovery process can only be initiated by DCMs that see Active Head/Tail or Passive Tail fixture 650 that have no active end node sends a Link Status Discovery message on both ports every 5 seconds with the Active End Node byte set to N (None). If a neighbor fixture 650 that sees an Active Head/Tail or Passive Tail receives this message, it initiates a link status discovery with the 'orphan' fixture 650.

During link status negotiation following recovery, a situation will arise where among the two DCMs negotiating link, one sees Active Head and the other sees Active Tail. This will therefore follow the Time to Block and Time to Block Reply message sequence as described in the section Fast Aging and MAC Table Refresh. This sequence results in the daisy chain link being complete with Tail's downstream port in Blocked state. Tail then starts sending its heartbeats to Head after receiving head heartbeats.

The following sequence of events takes place upon recovery of link on Tail's downstream port.

Tail processes the next DETM End Node Discovery message to allow discovery of its downstream link.

Upon receiving the End Node Discovery message, Tail sets its upstream port to Blocked state regardless of if the port has already been discovered or the port never failed. Blocking of the upstream port upon link recovery ensures that a network loop is not created.

The downstream port that was recovered is then set to Forwarding state.

DCM Link Status Discovery message is sent to the upstream port to rediscover the blocked upstream port.

When Link Status Discovery is received from the Tail, Tail's neighbor fixture 650 will have an Active Head. This will therefore follow the Time to Block and Time to Block Reply message sequence as described in the section Fast Aging and MAC Table Refresh. This sequence results in the daisy chain link being complete with Tail's downstream port in Blocked state.

The following sequence of events take place upon recovery of link on Tail's upstream port.

Tail initiate periodic Link Status Discovery message on its upstream port.

When Link Status Discovery is received from the Tail, Tail's neighbor fixture 650 will have an Active Head. This will therefore follow the Time to Block and Time to Block Reply message sequence as described in the section Fast Aging and MAC Table Refresh. This sequence results in the daisy chain link being complete with Tail's downstream port in Blocked state.

In both the above cases, once the daisy chain link is complete, Tail is able to listen to Head's heartbeats. This triggers the fast aging and MAC table refresh sequence as described in the section Fast Aging and MAC Table Refresh is performed. Tail then starts sending its heartbeats to Head after receiving head heartbeats.

Each fixture's 650 DCM keeps a record of its neighbor's status on both ports. Fixtures 650 uses the DCM Network Status message and the Head heartbeats to keep track of its neighbors. This mechanism addresses failure scenarios of a daisy chain. If the DCM application goes down and does not restart but the links on both ports do not go down, the daisy chain treats it as if the fixture 650 has failed.

When a fixture 650 does not receive a DCM neighbor status from its neighbor for 3 consecutive cycles, the fixture 650 blocks its port. If the fixture 650's neighbor is a Head, a Head heartbeat timeout also triggers the blocking of the fixture 650's port.

Head heartbeats are more frequent thus allowing faster execution of events in case of a break in the chain by monitoring head heartbeats.

This results in Tail losing head heartbeats for more than 900 ms (3 consecutive heartbeats).

Tail then sets its downstream port to Forwarding state.

The fast aging and MAC table refresh sequence as described in the section Fast Aging and MAC Table Refresh is performed.

Tail stops sending its heartbeats targeted to Head.

When the neighbor recovers and the application is started, the neighbor initiates a link discovery process.

The failure of Managed Switch A presents itself as if it was a failure of the Ethernet cables attached to the Head fixture 650 in each daisy chain. Daisy chain recovery actions proceed as for that scenario (described previously).

The failure of Managed Switch B presents itself as if it was a failure of the Ethernet cables attached to the Tail fixture 650 in each daisy chain. Daisy chain recovery actions proceed as for that scenario (described previously).

If DETM A was the Primary DETM that was controlling the fixtures 650, then a failure of Managed Switch A will cause it to be isolated from the fixtures 650. DETM A will inform DED A of its inability to manage the fixtures 650, which will in turn cause DED B to attempt to become Primary In that case, the fixtures 650 attempt to communicate with DETM B (via Managed Switch B).

If DETM B was the Primary DETM that was controlling the fixtures 650, then a failure of Managed Switch B will cause it to be isolated from the fixtures 650. DETM B will inform DED B of its inability to manage the fixtures 650, which will in turn cause DED A to attempt to become Primary. In that case, the fixtures 650 attempts to communicate with DETM A (via Managed Switch A).

As described above, embodiments can be in the form of processor implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. Finally, the term "about" is intended to include the degree of error associated with measurement of the particular quantity and/or manufacturing tolerances based upon the equipment available at the time of filing the application.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A daisy chain communication network comprising:
    a terminal manager operable as a server;
    a plurality of managed switches;
    a plurality of fixtures operable as clients of a client server network;
    a first port of a first fixture of the plurality of fixtures operably connected to a port of a first managed switch of the plurality of managed switches;
    a second port of the first fixture of the plurality of fixtures operably connected to a first port of a second fixture of the plurality of fixtures;
    a second port of the second fixture of the plurality of fixtures operably connected to a first port of a second managed switch of the plurality of managed switches to form the daisy chain communication network;
    wherein the first managed switch transmits a discovery message to the first fixture of the plurality of fixtures and the second managed switch transmits the discovery message to the second fixture of the plurality of fixtures;
    wherein the first fixture of the plurality of fixtures captures the discovery message and the second fixture of the plurality of fixtures captures the discovery message;
    wherein a first head fixture and at least one of a second head fixture and a tail fixture are determined from the discovery message;
    wherein an intermediate fixture is discovered based on the first head fixture and the at least one of the second head fixture and the tail fixture in the daisy chain communication network;
    wherein a location and address of the first head fixture and the at least one of the second head fixture and the tail fixture in the daisy chain communication network is resolved to identify an active head fixture;
    wherein the active head fixture and a passive tail fixture are established, wherein a MAC table for the plurality of managed switches and the plurality of fixtures of the daisy chain communication network is refreshed based on the resolved position of the first head fixture and the at least one of the second head fixture and the tail fixture in the daisy chain communication network.

2. The daisy chain communication system of claim 1, wherein the daisy chain communication network is an Ethernet network and operates at layer two of the Ethernet network.

3. The daisy chain communication system of claim 1, wherein the terminal manager and the plurality of managed switches are part of an elevator controller in an elevator control system and the plurality of fixtures include at least one of hall call buttons, lanterns, and kiosks.

4. A method of interconnecting a daisy chain communication network having a plurality of terminal managers operable as a server in operable communication with a plurality of managed switches and a plurality of fixtures operable as clients of a client server network, the method comprising:
    operably connecting a first port of a first fixture of the plurality of fixtures to a port of a first managed switch of the plurality of managed switches;
    operably connecting a second port of the first fixture of the plurality of fixtures to a first port of a second fixture of the plurality of fixtures;
    operably connecting a second port of the second fixture of the plurality of fixtures to a first port of a second managed switch of the plurality of managed switches to form the daisy chain communication network;
    transmitting a discovery message from a first terminal manager of the plurality of terminal managers to at least one of the first managed switch and the second managed switch;
    transmitting the discovery message from the first managed switch to the first fixture of the plurality of fixtures and transmitting the discovery message from the second managed switch to the second fixture of the plurality of fixtures;
    capturing the discovery message in a first head fixture and at least one of a second head fixture and a tail fixture in the daisy chain communication network;
    determining from the discovery message the first head fixture and the at least one of the second head fixture and the tail fixture;
    discovering at least one intermediate fixture based on the first head fixture and the at least one of the second head fixture and the tail fixture in the daisy chain communication network;
    resolving which of the first head fixture and the at least one of the second head fixture and the tail fixture is to be identified as an active head fixture;
    establishing the active head fixture and a passive tail fixture and refreshing a MAC table for the plurality of managed switches and the plurality of fixtures of the daisy chain communication network.

5. The method of claim 4, wherein the daisy chain communication network operates at layer two of an Ethernet network.

* * * * *